W. J. FISHER.
JOURNAL BEARING.
APPLICATION FILED JULY 24, 1908.
911,224.
Patented Feb. 2, 1909.
2 SHEETS—SHEET 1.
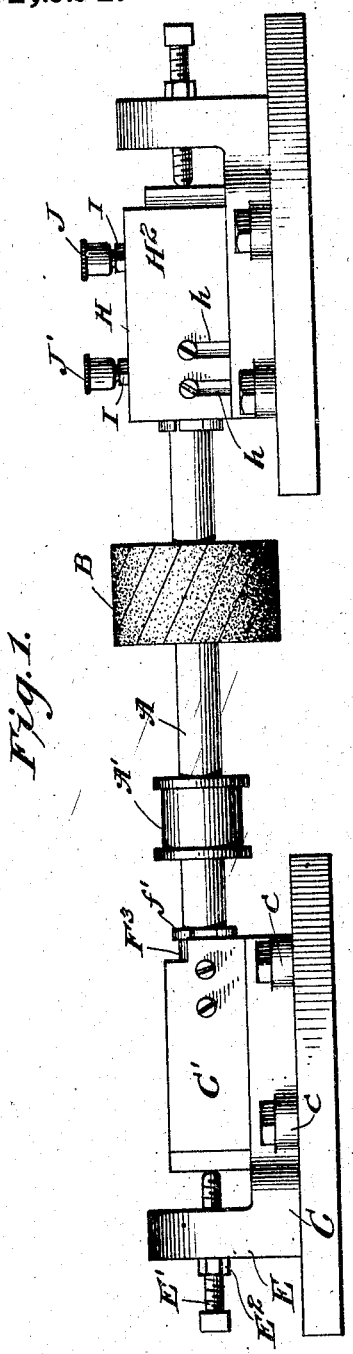
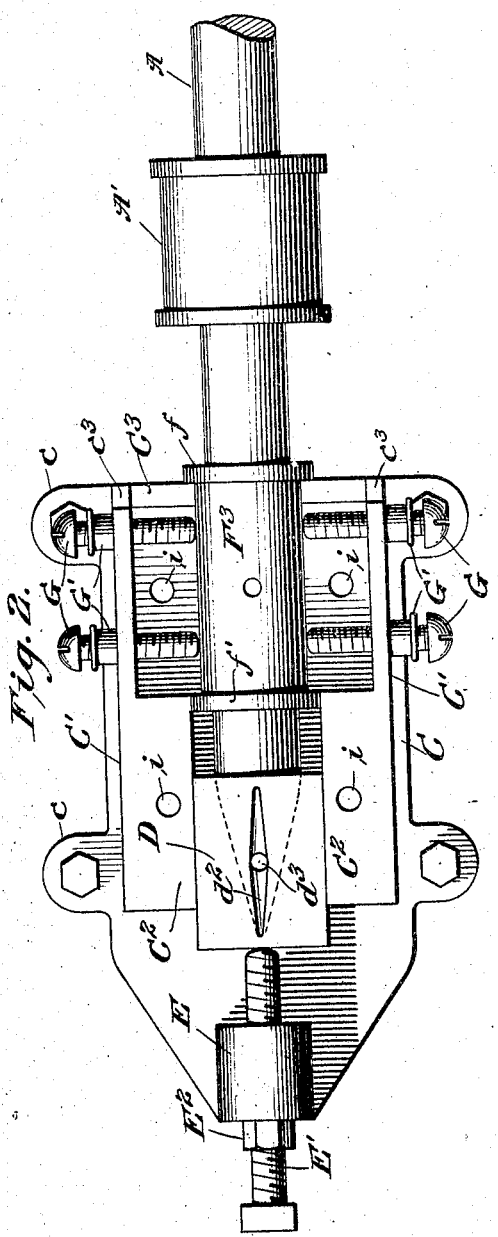
Witnesses
M. C. Lyddane
J. A. L. Mulhall
Inventor
William J. Fisher
By Joshua R. H. Potts
Attorney

W. J. FISHER.
JOURNAL BEARING.
APPLICATION FILED JULY 24, 1908.

911,224.

Patented Feb. 2, 1909.
2 SHEETS—SHEET 2.

Inventor
William J. Fisher

Witnesses
M. C. Lyddane
J. A. L. Mulhall

By Joshua R. H. Potts
Attorney

UNITED STATES PATENT OFFICE.

WILLIAM J. FISHER, OF PHILADELPHIA, PENNSYLVANIA.

JOURNAL-BEARING.

No. 911,224.  Specification of Letters Patent.  Patented Feb. 2, 1909.

Application filed July 24, 1908. Serial No. 445,074.

*To all whom it may concern:*

Be it known that I, WILLIAM J. FISHER, a citizen of the United States, residing at Philadelphia, in the county of Philadelphia and State of Pennsylvania, have invented certain new and useful Improvements in Journal-Bearings, of which the following is a specification.

My invention relates to journal bearings, and particularly to bearings supporting both ends of a spindle or shaft as in buffing machines and kindred apparatus.

The object of my invention is to provide a bearing in which the wear of the shaft may be easily taken up or compensated for, and one wherein the spindle or shaft will keep properly centered as it is worn.

Another object is to produce a bearing of this character in which the parts may be kept constantly oiled and the journal box be taken apart so that the journal may be cleaned or inspected.

To these ends my invention consists in a bearing having an adjustable bearing block formed with a conical recess on its face adapted to receive the conical end of a spindle, in combination with laterally adjustable bushings supporting the end of the spindle.

It also consists in a bearing of the character described provided with a sectional casing, the lower portion of which is adapted to contain oil, the upper portion being provided with oil cups.

The invention further consists in a bearing of the character described having a sectional bushing, and means for adjusting the sections.

Figure 3:
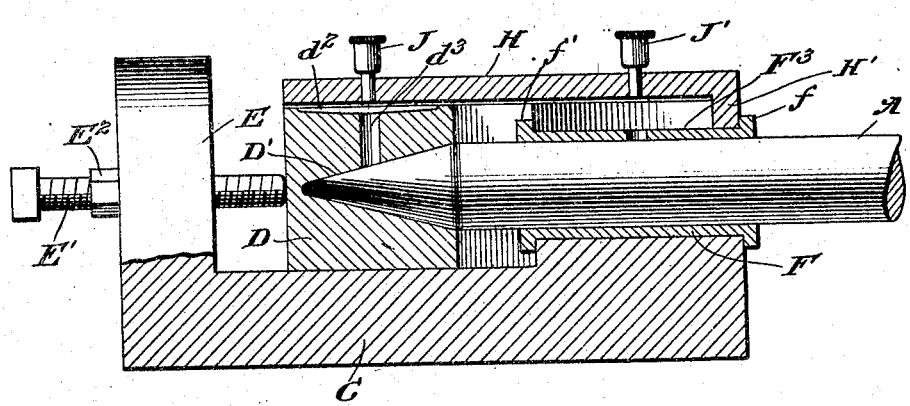
Figure 4:
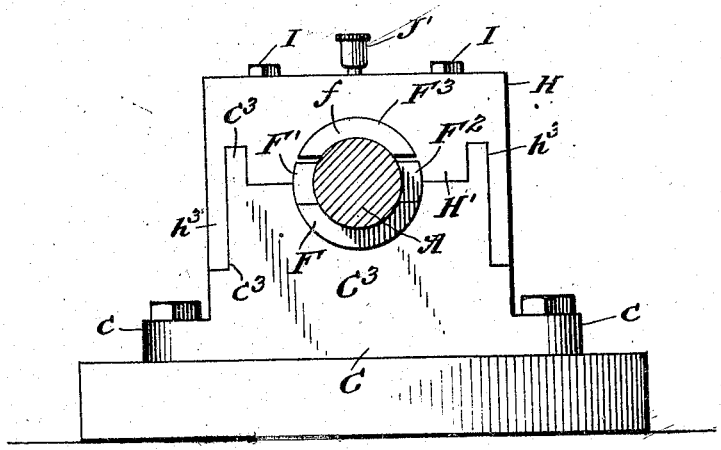
Figure 5:
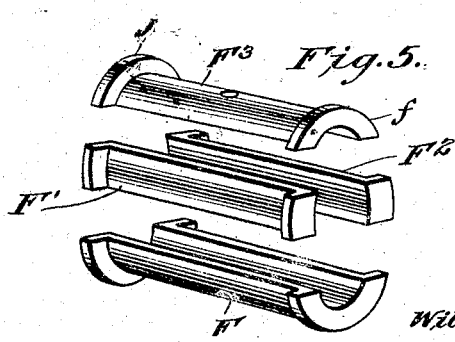

In the accompanying drawings Figure 1, is a view in side elevation illustrating my improvements. Fig. 2, is a top plan view with the cover removed. Fig. 3, is a view in longitudinal section. Fig. 4, is an end view showing the shaft A in cross section, and Fig. 5, is a detail perspective view of the section bushing.

In the drawings A designates a rotating spindle or other shaft carrying a driving pulley A'. The shaft is shown as provided with a buffing wheel B; but this is purely for illustration, the purpose of the shaft being immaterial. Both ends of the shaft are mounted alike; and hence the description of one of the bearings will equally apply to the bearings at the opposite end of the spindle.

My journal box is formed in two halves, the lower having a base C from which ears e project by which it may be attached in position. Located inward of the side edges of the base a distance equal to the thickness of the box cover are the upwardly projecting side walls C', which extend upward the full height of the bearing. The walls for about half their length at the rear are thickened as at C², the space between the walls C² forming a slide way for a bearing block D, which fits snugly between the walls. The face of this block is formed with a conical bearing recess D' in which fits and rotates the conical end of the spindle A.

The base C of the lower half of the box is rearwardly extended beyond the body of the box and there formed with an upwardly projecting post E through which an adjusting screw E' passes, the end of the adjusting screw bearing against the rear face of the block D whereby the block may be held in any desired position, a nut lock E² being used to hold the adjusting screw set. The sliding block is to be made of chilled steel or like material having the conical bearing drilled out thereof to snugly receive the conical end of the spindle. At its forward end the base has the upwardly projecting wall C³ which extends upward approximately half the total depth of the box, and is cut out at its center to receive the lower half of the bushing.

The forward half of the sides C' is preferably thinner than the portion C², as this portion of the wall does not act as a guide for the block D, and a relatively wide space is left between the walls C' and the spindle A. Surrounding the spindle A at this point are the brass bushing sections F, F', F², F³, each consisting of a segment of a complete cylindrical bushing, and together almost completely surrounding the spindle.

When the bushings are first placed around the spindle the edges do not meet; thus a sufficient space is left to allow for wear; and the bushing sections gradually close up near to each other. There are four bushing sections, one F being beneath the spindle, one F³ above and two F', F² on the sides. Each section is provided at its ends with outwardly projecting flanges f, f'. The outside measurement of the inner flange f' diametrically across the bushing is equal to the width between the walls C², C³; and the inner end of the bushing is intended to be inserted between these walls. The bushing is just sufficiently long so as to project out beyond the inner face of the box as shown in the plan Fig. 2.

Passing through the side walls C' are the screws G, two on each side adapted to bear against the side sections F', F² of the bushing, and to be adjusted so as to force the side sections inward against the spindle so as to hold the spindle against any lateral play. There are two screws G on each side of the journal box, and hence the two ends of the bushing may be differently adjusted or the bushing may be accurately set so that it is in exact parallelism with the spindle. Each of the adjusting screws G is provided with lock nuts G' whereby the screws may be locked in any position to which they are set.

The cover H of the journal box is adapted to fit over the side walls C', C², and to bear at its lower edge against the base C. The rear or outer end of the cover is open so as to allow the projection of the block D. The front of the cover is provided with a downwardly projecting wall H' which extends half-way down the cover to meet the upwardly projecting wall C³ of the lower portion of the journal box.

In order to hold the cover rigidly connected to the lower half of the journal box so that there shall not be any sidewise movement after the cover is in place, I provide the meeting edges of the cover and of the base on the front of the box with projections and recesses $c^3$, $h^3$ which enter into each other.

As before noted the bushings project beyond the front of the box, and the front flange $f$ projects laterally outward against the front. The side walls H² of the cover are slotted as at $h$ for the passage of the screws G and the nuts G'.

The cover is provided with four bolts I, two on each side adapted to enter bolt holes $i$ formed in the upper edge of the walls C² and the base C. These bolts are for the purpose of fastening the cover down in place upon the base. In order to properly lubricate the block D, and the inner face of the bushings F, I provide oil cups J, J', the oil cup J being attached to the cover at a point approximately over the block D, while the oil cup J' is located over that portion of the shaft or spindle which is supported by the bushings F. These oil cups are of the ordinary construction and have passages therefrom leading to the inner side of the cover.

The block D is grooved as at $d^2$ on its upper face, the groove running longitudinally across the face of the block, the walls of the groove inclining downward towards the center where a passage $d^3$ extends to the interior of the conical bearing recess of the block.

The operation of my invention is as follows: As the spindle or the block A wears, the block may be adjusted up by means of the adjusting screw E' and this to any extent desired, so that the bearing may be set to run hard or easy. The bearing recess within the block D being conical and the end of the spindle being conical, the wear will constantly center the shaft and the shaft can never get out of center. In order that all the wear shall not come upon the end of the spindle and to prevent any lateral thrust, I provide the adjustable bushings having the side screws G. These bushings may be easily renewed or changed or set by removing the cover of the box, and may be easily and accurately adjusted to suit the exigencies of running by means of the screws G which are of course held in position when set by the set nuts G'.

My invention provides a bearing adapted to be used for shafts demanding a high speed and accurate support. The journal box will carry a large amount of oil, and may be easily taken apart for inspection or packing. The main element of advantage in my invention resides however in the extreme delicacy with which the bearing may be adjusted, its centering qualities and the ease with which the shaft or spindle may be rotated therein.

It will be noted that it is not necessary to remove the cover of the box in order to adjust the block D, and thus if the machine is running too hard it is a simple matter to reverse the screw E' to a slight degree, thus releasing the block D and allowing it to move outward, whereas if the shaft is running too loosely it is only necessary to turn up the screw until the desired adjustment is arrived at. The cover H entirely protects the bearing from dirt, yet it may be easily removed for adjustment or repair. One of the main advantages of the invention lies in the ease with which the bearings may be adjusted while the machine is running and without removing the cover.

Having thus described my invention what I claim as new and desire to secure by Letters Patent is:

1. In a journal bearing, a bushing composed of a bottom and top section and two opposed side sections, a box having a base portion supporting the lower section and having upwardly projecting sides, a sliding block mounted at the end of said opposed section and having a conical recess for the reception of the end of the shaft supported in said bushing and mounted to move independently of the shaft, a screw supported on said base for forcing said block inward against the shaft, a cover adapted to inclose said block and bushings and resting upon said base, oiling openings in said cover, and adjusting screws projecting through the sides of said base and said cover and bearing against the side sections of the bushings.

2. In a journal bearing, a base having upwardly projecting sides, the base extending laterally beyond said sides, and a rearwardly projecting portion having a standard thereon, a sliding bearing block guided between said sides, an adjusting screw passing through said standard and engaging with said block, said block having a conical recess in its face for the reception of the end of a shaft, a bushing supported between the said sides at the end of said base opposite the standard, said bushing comprising a lower section, a top section and two side sections, adjusting screws passing through the said sides and engaging with said side sections of the bushing to force them inward against the shaft, lock nuts for holding said screws set, a cover having downwardly projecting sides adapted to extend downward over the sides of the base portion, said cover and base sides being slotted for the passage of the bushing adjusting screws, bolts for holding said cover in engagement with the base, and oil cups on said cover above the sliding block and the uppermost bushing section, said block and bushing sections having oil passages from their surface to the interior thereof.

3. In a journal bearing, a base, a sliding bearing block mounted in said base having a conical recess for the reception of the conical end of a shaft, a screw for independently adjusting said block against the end of a shaft, and a cover fitting over said block and upon said base, said cover being provided with oil cups opening on the inside of the cover above the block, said block having a longitudinally extending groove on its upper face, and a passage leading from the lowest portion of said groove to the interior of said conical recess.

4. In a journal bearing, a base having a longitudinal guide-way, a cover on said base, a block movable in said guide-way having a recess to receive the end of a shaft, and an oil inlet duct connecting said recess with a longitudinal tapering groove in the upper end of said block, means for supplying lubricant to said groove, and means for moving the block toward its shaft.

In testimony whereof I have signed my name to this specification in the presence of two subscribing witnesses.

WILLIAM J. FISHER.

Witnesses:
J. A. L. MULHALL,
FREDERIC B. WRIGHT.